United States Patent [19]

van der Lely

[11] 4,128,129
[45] Dec. 5, 1978

[54] SOIL CULTIVATING IMPLEMENTS

[76] Inventor: Cornelis van der Lely, 7 Brüschenrain, Zug, Switzerland

[21] Appl. No.: 746,085

[22] Filed: Nov. 30, 1976

[30] Foreign Application Priority Data

Dec. 1, 1975 [NL] Netherlands .................. 7513961

[51] Int. Cl.² ........................................... A01B 33/06
[52] U.S. Cl. .................................. 172/59; 172/50; 172/63; 172/70; 172/103; 172/767
[58] Field of Search .................. 172/40, 42, 43, 47, 172/49, 50, 54, 59, 63, 70, 71, 72, 103, 112, 145, 148, 197, 199, 200, 767, 150, 68

[56] References Cited

U.S. PATENT DOCUMENTS

| | | | |
|---|---|---|---|
| 159,811 | 2/1875 | Gardner | 172/199 |
| 654,353 | 7/1900 | Oldham | 172/150 |
| 665,217 | 1/1901 | Hays | 172/199 |
| 939,715 | 11/1909 | Kraak | 172/103 X |
| 961,181 | 6/1910 | Vickers | 172/103 |
| 1,094,313 | 4/1914 | Dowell | 172/199 |
| 1,143,032 | 6/1915 | Bresee | 172/767 X |
| 1,757,511 | 5/1930 | Brewer | 172/103 X |
| 1,878,442 | 9/1932 | Hamshaw | 172/43 |
| 2,652,760 | 9/1953 | Card | 172/68 X |
| 2,772,618 | 12/1956 | Schmidt | 172/200 X |
| 2,871,956 | 2/1959 | Boyd-Brent | 172/72 |
| 2,871,959 | 2/1959 | Koskenmaki | 172/200 X |
| 2,888,993 | 6/1959 | Dunning | 172/103 X |
| 3,106,969 | 10/1963 | Carter | 172/767 X |
| 3,448,813 | 6/1969 | Rogers | 172/40 |
| 3,774,689 | 11/1973 | Lely et al. | 172/112 |
| 3,783,948 | 1/1974 | Lely et al. | 172/49 |
| 3,944,000 | 3/1976 | Lely et al. | 172/59 |

FOREIGN PATENT DOCUMENTS

| | | | |
|---|---|---|---|
| 218499 | 3/1958 | Australia | 172/68 |
| 2023272 | 12/1970 | Fed. Rep. of Germany | 172/40 |
| 565501 | 8/1975 | Switzerland | 172/70 |

Primary Examiner—Paul E. Shapiro
Attorney, Agent, or Firm—Mason, Mason & Albright

[57] ABSTRACT

A soil cultivating machine has a row of tined rotors on an elongated frame portion that extends transverse to the direction of travel. An elongated soil crumbling member is pivoted to the frame portion at the front of that portion and settable to level the ground and provide support for the machine. A second elongated crumbling member is linked at the rear of the frame portion for free pivoting responsive to ground irregularities to further crumble the soil worked by the tined rotors. Both crumbling members have parallelogram linkage connections so that the relative positions of the crumbling members to the frame portion can vary without those members tilting. The bottoms of the crumbling members can be corrugated plates or other configured elements designed to bear on the ground and be self cleaning. Also, the rotors can have resilient or freely rotatable mountings to allow for the displacement of tines when meeting obstacles.

23 Claims, 19 Drawing Figures

SOIL CULTIVATING IMPLEMENTS

For a better understanding of the invention, and to show how the same may be carried into effect, reference will now be made, by way of example, to the accompanying drawings, in which:

FIG. 10 is an elevation illustrating an alternative form of rotary soil working or cultivating member that may form part of an implement in accordance with the invention, FIG. 11 is a plan view as seen in the direction indicated by an arrow XI in FIG. 10, FIGS. 12, 14, 16 and 18 are similar views to FIG. 10 and show further alternative rotary soil working or cultivating members that may be used in implements in accordance with the invention, and FIGS. 13, 15, 17 and 19 are plan views as seen in the directions indicated by arrows XIII, XV, XVII and XIX in FIGS. 12, 14, 16 and 18 respectively.

Figure 1:
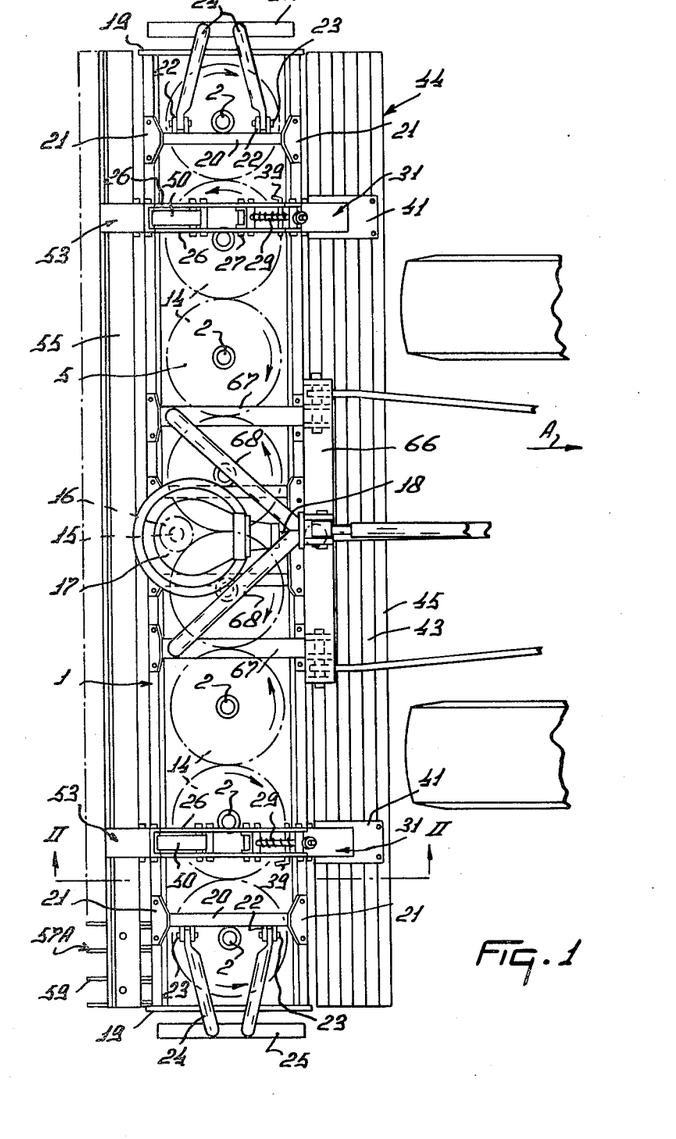
FIG. 1 is a plan view of a soil cultivating implement in accordance with the invention connected to the rear of an agricultural tractor.
Figure 2:
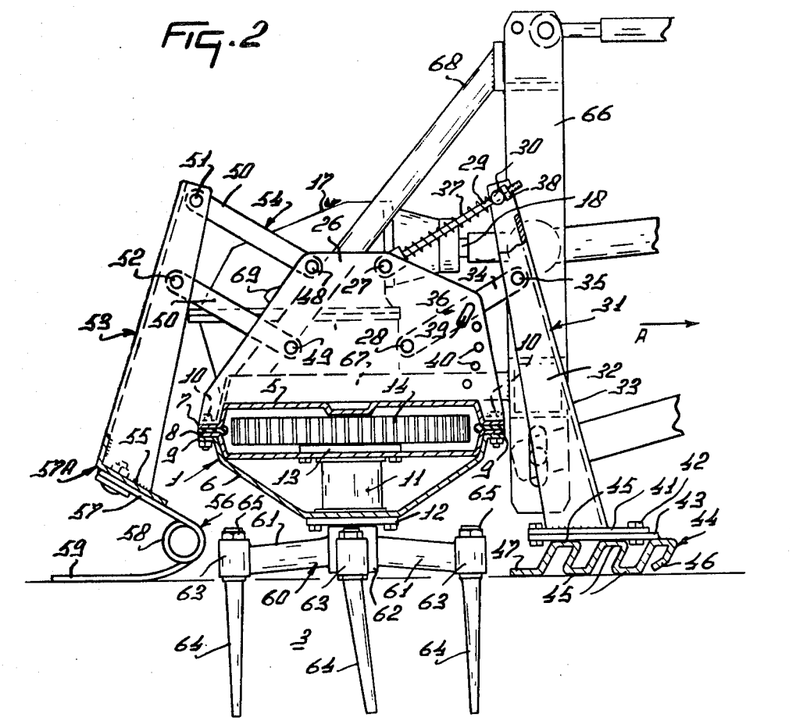
FIG. 2 is a section, to an enlarged scale, taken on the line II—II in FIG. 1.

Referring firstly to FIGS. 1 and 2 of the drawings, the soil cultivating implement or machine that is illustrated therein has a frame which includes a hollow box-shaped frame portion 1 that extends substantially horizontally transverse, and usually substantially perpendicular (as illustrated), to the intended direction of operative travel of the implement which is indicated by an arrow A in FIG. 1 of the drawings and in the same way in the following Figures of drawings. A plurality (in this case, eight) of substantially vertical, or at least upwardly extending, shafts 2 are rotatably journalled in the hollow frame portion 1 in a single row that extends parallel to the length of that portion and thus perpendicular or substantially perpendicular to the direction A. The axes of rotation of the eight shafts 2 are spaced apart from one another by regular intervals of exactly, or substantially, 37.5 centimeters and the lowermost end of each shaft 2 that projects from beneath the bottom of the hollow frame portion 1 has a corresponding rotary soil working or cultivating member 3 firmly but releasably secured to it. The frame portion 1 is formed principally from steel sheet and comprises an upper gear casing 5 and an underlying trough 6, the substantially horizontal longitudinal axes of the casing 5 and trough 6 being parallel or substantially parallel to one another. As can be seen best in FIG. 2 of the drawings, the gear casing 5 has a substantially oblong cross-section whereas the trough 6 which lies beneath it has a cross-section which is substantially trapezoidal, the broad base of the trapezium being uppermost to coincide with the bottom of the substantially oblong casing 5. The casing 5 has upper and lower walls that are both formed from sheet steel, the top wall comprising a substantially horizontal central portion that is bent over downwardly in a symmetrical manner at both its front and rear edges with respect to the direction A. The downwardly bent-over portions terminate in horizontal or substantially horizontal clamping rims 7 that extend throughout the transverse length of the whole frame portion 1.

The lever wall of the casing 5 has a horizontal or substantially horizontal central portion which is bent over upwardly, in a symmetrical manner, at its front and rear edges, with respect of the direction A, the bent-over portions terminating in horizontal or substantially horizontal clamping rims 8. The two downwardly bent-over portions and clamping rims 7 of the upper wall of the casing 5 are not only symmetrical with respect to one another but are also symmetrical with respect to the two upwardly bent-over portions and the corresponding clamping rims 8 of the lower wall of the casing 5 and, with this arrangement, the clamping rims 7 and 8 co-operate with an intervening hard strip-shaped synthetic plastics gasket at a level midway between that of the general plane of the upper wall and the general plane of the lower wall of the casing 5. That part of the trough 6 which is not afforded by the lower wall of the casing 5 takes the form of a sheet steel plate having a horizontal or substantially horizontal central portion that is flanked by symmetrically upwardly bent-over portions whose upper edges merge into more steeply upwardly bent-over portions that bear against the outer surfaces of the upwardly bent-over portions of the lower wall of the trough 6. These portions of the lower wall of the trough 6 terminate in horizontal or substantially horizontal clamping rims 9 that extend throughout the transverse length of the frame portion 1 and lie beneath the clamping rims 8. The rims 7 and 8 of the upper and lower walls of the casing 5 are clamped to the intervening gasket by a plurality of vertically disposed bolts 10 and it is preferred that further bolts (not shown) should alternate with the bolts 10 to secure the rims 9 of the lower wall of the trough 6 to the overlying rims 7 and 8. The clamping rims 9 of the lower wall of the trough 6 afford a support for the gear casing 5 and, with the preferred arrangement that has just been mentioned, the further bolts can be withdrawn to allow the lower wall of the trough 6 to be removed without having to break the seal between the rims 7 and 8 of the upper and lower walls of the gear casing 5.

The lower wall of the casing 5 and the central portion of the lower wall of the trough 6 are formed with rows of vertically registering holes whose centers are spaced apart from one another along the rows by the same distances as are the axes of rotation of the shafts 2, said distances thus being exactly, or substantially, 37.5 centimeters. The registering holes receive the upper and lower ends of bearing housings 11 that are provided with vertically aligned bearings (not visible) for the rotary support of the corresponding shafts 2. The lower end of each bearing housing 11 comprises a flange 12 that is bolted to the central substantially horizontal portion of the lower wall of the trough 6 while the upper end of each bearing housing 11 is of slightly reduced diameter as compared with the remainder thereof, the reduced diameter portion extending through the corresponding hole in the lower wall of the casing 5 and upwardly for a short distance into that casing. The upper end co-operates with a surrounding and closely fitting ring 13 that is bolted to the lower wall of the casing 5 around the respective hole therein. The ring 13 has a rim or shoulder that penetrates downwardly through said hole into the chamber defined by the trough 6 and sealing rings or other gaskets (not visible) are provided between the lower surface of the ring 13 and the upper surface of the lower wall of the casing 5 and in a circumscribing groove formed in the reduced diameter portion of the housing 11 between that portion and the surrounding dounwardly directed rim or shoulder of the ring 13. Oil or other lubricant will normally be contained inside the gear casing 5 and the arrangement that has just been briefly described is effective in preventing that oil or other lubricant from leaking downwardly from the casing 5 into the hollow interior of the chamber that is defined by the trough 6. The upper ends of the shafts 2 extend above the bearing housings 11 into the casing 5 and are there provided with corresponding straight-toothed or spur-toothed pinions 14 whose sizes and arrangements are such that the teeth of each pinion 14 are in mesh with those of the neighbouring pinion, or with those of each of the two neighbouring pinions, in the single row thereof.

The frame portion 1 is provided, substantially midway across the width thereof, with a substantially vertical shaft 15 carrying a pinion 16 whose teeth are in mesh with those of one of the center pair of the row of eight pinions 14. The shaft 15 and pinion 16 are near the rear of the frame portion 1 with respect to the direction A and the shaft 15 is rotatably mounted in substantially vertically aligned bearings that are carried by the top and bottom walls of the gear casing 5, said shaft 15 projecting upwardly beyond the upper one of those bearings into a gear box 17 that is mounted on top of the casing 5 substantially midway across the width thereof. The shaft 15 is provided, inside the gear box 17, with a bevel pinion (not visible) whose teeth are in driven mesh with those of a further bevel pinion (not visible) carried by a substantially horizontal shaft 18 that extends substantially parallel to the direction A and whose leading end projects forwardly from the front of the gear box 17 to act as a rotary input shaft of that gear box. When the implement is in use, the forwardly projecting splined or otherwise keyed end of the shaft 18 is placed in driven connection with the power take-off shaft of an agricultural tractor or other operating vehicle by way of an intermediate telescopic transmission shaft, that is of a construction which is known per se, having universal joints at its opposite ends.

The opposite ends of the hollow frame portion 1 are closed by substantially vertical side plates 19 that are in parallel relationship with one another and substantially parallel relationship with the direction A. Two supports 20 are carried by brackets 21, secured to the upper clamping rims 7, so as to extend parallel or substantially parallel to the direction A at locations that are spaced inwardly from the side plates 19 of the frame portion 1 by distances which are such that said support 20 are located very close, as seen in plan view (FIG. 1), to the two shafts 2 that correspond to the two rotary soil working or cultivating members 3 that are at the opposite ends of the row of eight of those members. Each support 20 carries two pairs of spaced lugs 22 that are directed towards the neighbouring end of the frame portion 1, the two lugs 22 of each pair being interconnected by a corresponding substantially horizontal pivot pin 23 that is in substantially parallel relationship with the direction A and with the other three pivot pins 23. Each pivot pin 23 has one end of a corresponding arm 24 turnably mounted on it, between the two lugs 22 of the corresponding pair, and it will be seen from FIG. 1 of the drawings that the two arms 24 which correspond to each support 20 initially extend outwardly to locations beyond the upper edge of the corresponding side plate 19 in convergent relationship with one another. The arms 24 are then bent over downwardly and are secured to the tops of corresponding shield plates 25 which are substantially vertically disposed so as to extend substantially parallel to the direction A. The lowermost edges of the shield plates 25 are shaped to slide over the ground surface in the direction A and it will be evident that each shield plate 25, and the corresponding pair of arms 24, is turnable upwardly relative upwardly and downwardly to the frame portion 1 about the axis defined by the corresponding pair of pivot pins 23. This enables the shield plates 25 to match undulations in the surface of the ground that may be met with during operative travel in the direction A. The shield plates 25 cooperate with the neighbouring soil working or cultivating members 3 in working the soil and in preventing substantial ridging thereof at the margins of the broad strip of land that is worked by the implement and also act to prevent stones and other items that may be met with by the rapidly rotating soil working or cultivating members 3 from being flung laterally of the path of travel of the implement thus greatly reducing the danger of damage and/or injury from this cause.

The top of the hollow frame portion 1 is also provided, at two locations which are spaced inwardly from the corresponding side plates 19 by distances which are greater than the spacing therefrom of the supports 20, with corresponding pairs of substantially vertical plates 26, all four plates 26 being substantially parallel to one another and to the direction A. The plates 26 have a somewhat irregular shape which can, however, be seen clearly in FIG. 2 of the drawings, the two plates 26 of each pair being interconnected by an upper stub shaft 27 and a lower stub shaft 28, said stub shafts 27 and 28 defining axes that are substantially horizontally perpendicular to the direction A and the lower stub shaft 28 being a little further advanced with respect to said direction A than is the upper stub shaft 27. However, both the upper and lower stub shafts 27 and 28 of each pair are in front of an imaginary vertical plane containing the axes of rotation of all of the shafts 2 with respect to the direction A. Each upper stub shaft 27 has a forked bracket turnably mounted thereon between the corresponding pair of plates 26 and a rod 29 projects from the base of said bracket in a direction perpendicular to the longitudinal axis of the stub shaft 27 concerned. At a distance from the forked bracket, each rod 29 is entered through a perpendicular bore midway along a cylindrical block 30 that is mounted so as to be turnable about the longitudinal axis of the cylinder between the upper end of a pair of downwardly, and forwardly with respect to the direction A, inclined strips 32 whose widths in the direction A progressively increase from top to bottom (see FIG. 2). The leading edges of each pair of strips 32 are perpendicularly interconnected by a corresponding transverse portion 33 which is conveniently, but not essentially, integral with the two strips 32. Each pair of strips 32 and the corresponding transverse portion 33 together form an arm 31 which thus, like the strips 32, is downwardly and forwardly inclined from top to bottom with respect to the direction A.

A strip-shaped arm 34 has one end turnably arranged around each lower stub shaft 28 between the corresponding pair of plates 26, the opposite end thereof being turnably connected to the corresponding arm 31 by a substantially horizontal stub shaft 35 that perpendicularly interconnects the corresponding strips 32 in substantially parallel relationship with the stub shafts 27 and 28 and the longitudinal axes of the cilindrical blocks 30. FIG. 2 of the drawings shows that the stub shafts 27, 28 and 35 and the blocks 30 are at the four corners of corresponding pivotable linkages that are in the form of parallelogram linkages 36 so that the arms 31 are movable upwardly and downwardly, without significant tilting, relative to the hollow frame portion 1. Each rod 29 has a corresponding helical compression spring 37 wound around it so as to bear between the base of the corresponding forked bracket and one side of the corresponding cylindrical block 30. Each rod 29 is screwthreaded in the region of the corresponding block 30 and a nut 38 is mounted on the screwthreaded portion so as to be axially adjustable in position along that portion. Each spring 37 thus tends to maintain the corresponding block 30 firmly against the corresponding nut 38 but it will be realised that each arm 31 can, when required, turn about the corresponding stub shaft 35 in an anticlockwise direction as seen in FIG. 2 of the drawings against the action of the corresponding spring 37. The position of the nuts 38 axially along the screwthreaded portions of the rods 29 control the extents to which the springs 37 are initially compressed and, it will be realised, govern the exact shapes of the parallelogram linkages 36, that is to say, they dictate whether said linkages 36 are true parallelograms or deviate marginally from exact parallelism. Each strip-shaped arm 34 is formed with a hole at a location substantially midway between the corresponding stub shafts 28 and 35 and each pair of substantially vertical plates 26 is formed with corresponding curved rows of substantially horizontally aligned holes 40 that are all at the same distance from the stub shaft 28 concerned. Horizontal locking pins 39 are provided for entry through chosen pairs of the holes 40 and the hole in the intervening arm 34 and it will be evident that the particular pair of holes 40 that is chosen in each pair of plates 26 for co-operation with the corresponding locking pin 39 dictates the level of the corresponding arm 31 relative to the level of the frame portion 1.

The lowermost end of each arm 31 has a substantially horizontal support plate 41 welded or otherwise rigidly secured to it so as to extend substantially parallel to the direction A. Substantially vertically disposed bolts 42 firmly but releasably fasten a support 43 of a soil crumbling member 44 to the lower surface of each support plate 41, said soil crumbling member 44 also serving to support the implement from the ground surface during its use. The soil crumbling member 44 extends substantially horizontally parallel to the transverse length of the hollow frame portion 1 and thus perpendicular or substantially perpendicular to the direction A, said member 44 being releasably fastened to the two support plates 41 so as to extend throughout the working width of the immediately following rotary soil working or cultivating members 3. The implement supporting soil crumbling member 44 is in the form of a bent plate that is elongate in a direction parallel to the length of the hollow frame portion 1, the cross-sectional shape of the plate being clearly visible in FIG. 2 of the drawings. In fact, the ribbed plate comprises three upper portions 45 that are all substantially horizontally disposed with their fore and aft widths substantially parallel to the direction A, two similarly disposed lower portions 45 and a single free rear portion 47 that is coplanar with the two lower portions 45, having the same, or substantially the same, width as those portions 45 in the direction A. The free rear portion 47 and the upper and lower portions 45 are integrally interconnected by a number of substantially flat limbs that all extend obliquely upwardly and forwardly, with respect to the direction A, from bottom to top. The leading upper portion 45 has its front edge integrally connected to a free limb that is of a different shape to the other five limbs of the soil crumbling member 44. Said leading limb comprises a first portion which extends obliquely downwardly and rearwardly with respect to the direction A from the front edge of the leading upper portion 45 in parallel relationship with the other five limbs but, at a level approximately midway between that of the upper and lower portions 45, said leading limb is bent over obliquely rearwardly to form an edge portion 46 that terminates at a level which is just clear of the ground surface when the impelemnt is employed on flat land. In fact, as seen in FIG. 2 of the drawings, the cross-section of the bent plate which principally affords the soil crumbling member 44 is such as to define a series of alternately upright and inverted oblique-limbed U's, only the leading limb which incorporates the edge portion 46 and the free rear portion 47 departing from this configuration. The free rear portion 47 projects substantially horizontally rearwardly from its integral junction with the lower edge of the rearmost oblique limb of the member 44. It can be seen in FIGS. 1 and 2 of the drawings that the locations at which the lower ends of the two arms 31 are secured to the two support plates 41 are towards the rear of the implement-supporting soil crumbling member 44 with respect to the direction A.

Rear regions of the substantially vertical plates 26 that are behind an imaginary vertical plane which contains the axes of rotation of all eight of the shafts 2 with respect to the direction A carry upper and lower stub shafts 48 and 49 which stub shafts perpendicularly interconnect the two plates 26 of each pair with the upper stub shafts 48 being a little further advanced with respect to the direction A than are the lower stub shafts 49. The leading ends of upper and lower arms 50 are turnably mounted on the stub shafts 48 and 49 between the two plates 26 of the corresponding pairs and the rearmost ends of said arms 50 are turnably connected by upper and lower stub shafts 51 and 52 to parallel strips that form parts of two arms 53. The two arms 53 are of basically similar formation to the two arms 31, being of channel-shaped cross-section with the two parallel limbs of each arm integrally, or rigidly, interconnected at the rear thereof with respect to the direction A, each arm 53 being of progressively increasing width in the direction A from its top to substantially its bottom. It will be evident from FIG. 2 of the drawings that the stub shafts 48, 49, 51 and 52 are located at the four corners of pivotable linkages in the form of parallelogram linkages 54, the arms 53 thus being displaceable upwardly and downwardly relative to the hollow frame portion 1 without significant tilting.

The lower ends of the arms 53 are welded or otherwise rigidly secured to a single support beam 55 having the angular cross-section which can be seen in FIG. 2 of the drawings. The support beam 55 extends substantially horizontally parallel to the transverse length of the hollow frame portion 1 and thus perpendicular or substantially perpendicular to the direction A, said support beam 55 being of substantially the same length as the soil crumbling member 44 and being in register therewith in the direction A so as to cover the whole of the working width of the immediately foregoing row of rotary soil working or cultivating members 3. It can be seen from FIG. 2 of the drawings that the angular cross-section beam 55 comprises a lower and larger limb that is inclined downwardly and forwardly with respect to the direction A from its integral junction with an upper and smaller limb that is inclined upwardly and forwardly from said junction with respect to the same direction. The lower and larger limb of the support beam 55 has a plurality of tine-like elements 56 secured to its lower surface by bolts and clamping, the arrangement being such that said elements 56 are spaced apart from one another at short but substantially regular intervals along the whole length of the support beam 55. Each element 56 is formed from spring steel or other resilient material that is preferably, but not essentially, of circular or substantially circular cross-section and conveniently, as illustrated, said elements 56 are made in integral pairs, the junctions between said pairs being the parts that are secured to the lower surface of the support beam 55 by the bolts and clamping plates. Each element 56 comprises a first substantially straight portion 57 that is inclined downwardly and forwardly with respect to the direction A from the integral junction thereof with the equivalent portion 57 of the immediately neighbouring element 56. The leading lower end of each straight portion 57 merges into a helical coil 58 the opposite end of which is downwardly and rearwardly directed so as integrally to join a second horizontal or substantially horizontal portion 59 that is bent-over so as to extend parallel or substantially parallel to the direction A while bearing against the surface of the ground when the implement is in use. The support beam 55 and the elements 56 together afford a rear soil crumbling member that is generally indicated by the reference 57A.

Each of the shafts 2 projects from beneath the lower surface of the central portion of the lower wall of the trough 6 and is there splined to receive the hub 62 of a corresponding substantially cruciform support 60 that also comprises four arms 61 which radiate substantially horizontally (see FIG. 2) from the hub 62 at 90° intervals around the axis of the shaft 2 concerned. In fact, each arm 61 is inclined by a few degrees to the horizontal in such a way that the end thereof which joins the hub 62 is at a slightly higher level than is the opposite and outer end. The outer ends of all four of the arms 61 of each support 60 carry four corresponding substantially cylindrical sleeve-like tine holders 63 in which are firmly but releasably secured fastening portions of four corresponding rigid soil working tines 64. Each tine 64 also comprises a soil working portion that extends downwardly into the ground from its integral junction with the upper fastening portion and it is preferred, but is not essential, that said soil working portion should trail rearwardly from top to bottom by a few degrees with respect to the intended direction of operative rotation of the corresponding soil working or cultivating member 3 (see the small arrows which indicate these directions of rotation in FIG. 1). The soil working portions of the tines 64 are of downwardly tapering configuration and the fastening portions thereof are retained in the corresponding holders 63 by fastenening nuts 65 which bear against the upper ends of the holders 63 and co-operate with short screwthreaded upper parts of the tine fastening portions. A coupling member or trestle 66 is secured to the front of the hollow frame portion 1 with respect to the direction A at a position midway between the parallel general planes of the two side plates 19. The coupling member or trestle 66 is of substantially triangular configuration as seen in front or rear elevation, substantially its two lower corners being connected to supports 67 that extend substantially horizontally parallel to the direction A on top of the gear casing 5 of the hollow frame portion 1. The apex of member 66 is connected to two locations that are close to the rearmost ends of the two supports 67 by a pair of tie beams 68 that diverge both downwardly and rearwardly with respect to the direction A.

Before work commences using the soil cultivating implement that has been described with reference to FIGS. 1 and 2 of the drawings, the leading soil crumbling member 44 that supports the implement form the ground surface is set at a level relative to that of the hollow frame portion 1 which is appropriate to the desired maximum depth of penetration of the tines 64 of the members 3 into the soil. This level is dictated by the particular pairs of holes 40 that are chosen for cooperation with the locking pins 39 and the holes in the intervening arms 34 and it is noted that FIG. 2 of the drawings illustrates the soil crumbling member 44 positioned at a level that is appropriate to the greatest depth of penetration of the tines 64 into the soil which can be attained. The coupling member or trestle 66 is connected to the three-point lifting device or hitch at the rear of the agricultural tractor or other operating vehicle in the generally known manner which can be seen in outline in the drawings and the power take-off shaft of the same tractor or other operating vehicle is placed in driven connection with the splined or otherwise keyed forwardly projecting end of the shaft 18 by way of the known telescopic transmission shaft that has universal joints at its opposite ends. As the implement moves over a field in the direction A, its soil working or cultivating members 3 are rapidly revolved in the directions that are indicated by the small arrows in FIG. 1 of the drawings and, since diametrically opposed pairs of tines 64 of each member 3 are spaced apart from one another by somewhat greater distance than the spacing between the axes of rotation of the shafts 2, the strips of land that are worked by the individual members 3 overlap one another to form, in effect, a single broad strip of worked soil. The implement-supporting soil crumbling member 44 that immediately precedes the row of rotary soil working or cultivating members 3, levels, or substantially levels, a strip of land which coincides with, and has the same width as, the strip that is worked by the members 3. The particular cross-sectional shape of the bent plate that wholly or principally affords the member 44 is particularly effective in producing a satisfactory levelling and crumbling of the soil that is to be worked by the members 3. The lower portions 45 of the plate co-operate in levelling and crumbling the soil while the upper portions 45 act principally to crumble any lumps of earth that move over the top of the member 44. The lower portions 45 do most of the levelling and this is enhanced by the free rear portion 47 that is substantially coplanar with said lower portions 45. The downward and rearward, with respect to the direction A, inclination of the limbs which interconnect the portions 45 and 47 and the steeper inclination of the leading edge portion 46 ensure that the soil crumbling member 44 exerts a downward force upon anything that may stick to the bottom of the member 44 so that, sooner or later, any adhering material will tend to be cleaned off. The bottom to the soil crumbling member 44 provides a relatively large area of contact with the ground surface and said member is thus effective in supporting the implement from the ground while it is in operation.

The connections of the lower ends of the arms 31 to the support plates 41 of the soil crumbling member 44 at locations which are towards the rear of that member enable the front thereof with respect to the direction A to be displaced upwardly, with the frame portion 1 and the rotary soil working or cultivating members 3, in the event that a large stone or other firmly embedded obstacle is met with. If a large loose stone, for example, should become momentarily jammed between one or more of the rotary members 3 and the soil crumbling member 44, the arms 31 can turn forwardly about the axis defined by the stub shafts 35 in an anticlockwise direction as seen in FIG. 2 of the drawings, against the action of the springs 37, until said stone or the like is released. The springs 37 then immediately and automatically bring the cylindrical blocks 30 back into contact with the adjustable stop nuts 38. Since the implement-supporting soil crumbling member 44 is connected to the frame portion 1 through the intermediary of the parallelogram linkages 36, said member does not tilt significantly when it is adjusted to a different horizontal level relative to that of the frame portion 1 and thus maintains its optimum disposition relative to the ground surface. It is noted that, if desired, the locking pins 39 may be temporarily removed whereafter the angularity of the parallelogram lingages 36 becomes freely varable and the soil crumbling member 44 loses its implement-supporting ability and functions substantially only to level and initially crumble the broad strip of soil that is to be worked by the immediately following rotary members 3.

The rear soil crumbling member 57A bears against the ground surface, during the operation of the implement, by way of the second horizontal or substantially horizontal portions 59 of the tine-like elements 56. Said elements 56 engage the soil that is pushed rearwardly towards them by the rotary soil working or cultivating members 3 and perform a still further crumbling action thereon. The crumbled earth is distributed substantially uniformly throughout the working width of the implement by the horizontal or substantially horizontal portions 59 of the elements 56 and a thoroughly crumbled and substantially uniformly distributed bed of soil can usually be produced by the implement in a single traverse of the land. The rear soil crumbling member 57a is freely upwardly and downwardly displaceable relative to the frame portion 1, without tilting, due to its indirect connection to said frame portion by way of the parallelogram linkages 54. The free upward and downward movability of the rear soil crumbling member 57A enables that member to follow undulations in the surface of the ground that may be met with during the use of the implement and the fact that it is brought about by way of the parallelogram linkages 54 ensures that said member 57A can move upwardly and downwardly without significant tilting, thus maintaining the optimum position of the rear soil crumbling member 57A relative to the ground surface. Stops 69 are provided in the paths of downward pivotal movement of the upper arms 50 to ensure that, when the implement is lifted clear of the ground for inoperative transport, the member 57A does not move too far downwardly.

Figure 3:
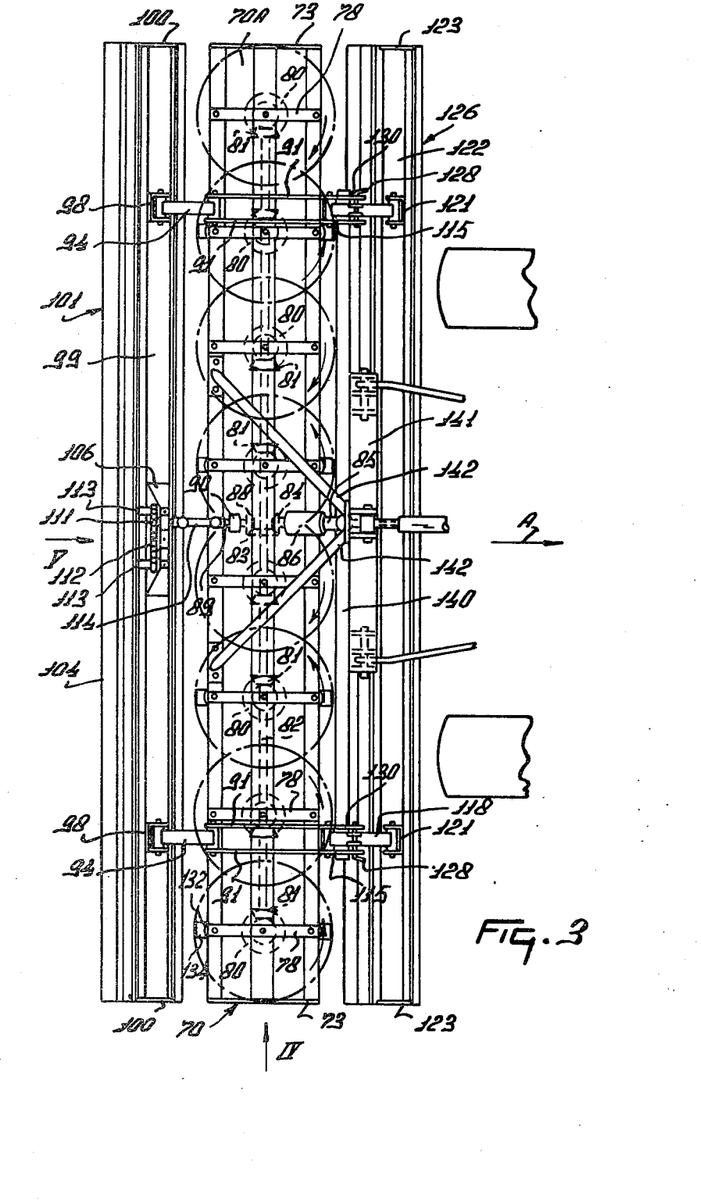
FIG. 3 is a plan view of a second form of soil cultivating impelement in accordance with the invention connected to the rear of an agricultural tractor.
Figure 4:
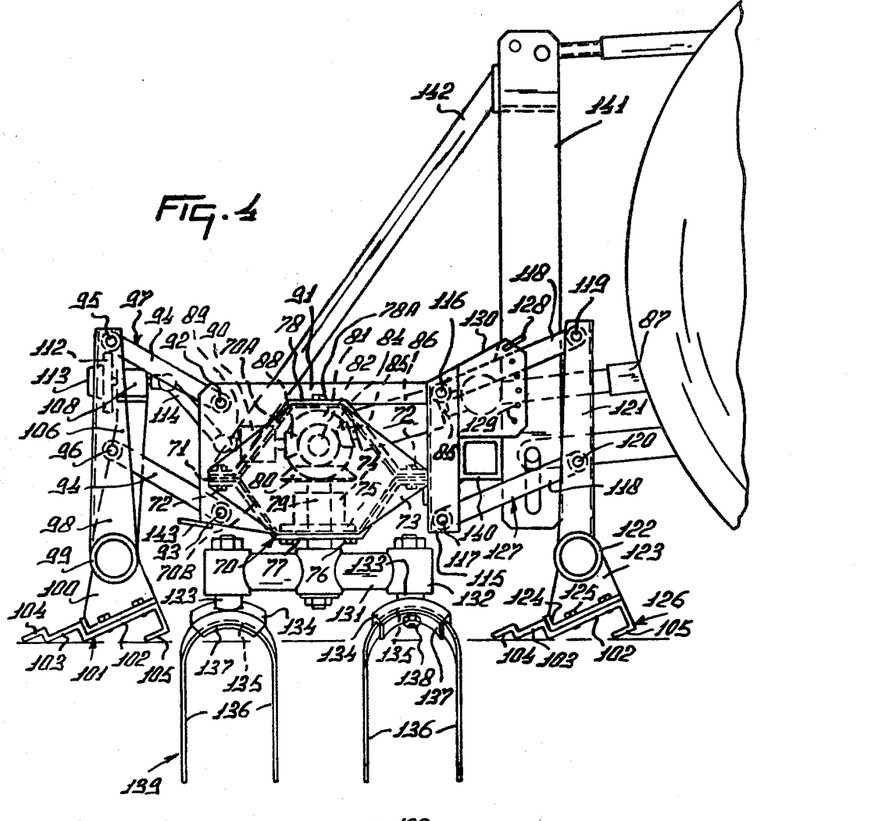
FIG. 4 is a side elevation, to an enlarged scale, as seen in the direction indicated by an arrow IV in FIG. 3.
Figure 5:
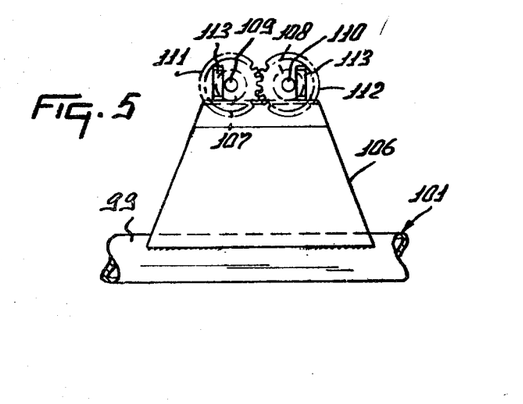
FIG. 5 is a rear elevation of a central region of the impelement of FIGS. 3 and 4 as seen in the direction indicated by an arrow V in FIG. 3, FIGS. 6, 7 and 8 are side elevations illustrating three alternative forms of supporting and/or soil crumbling member that may form a part of an implement in accordance with the invention.
Figure 9:
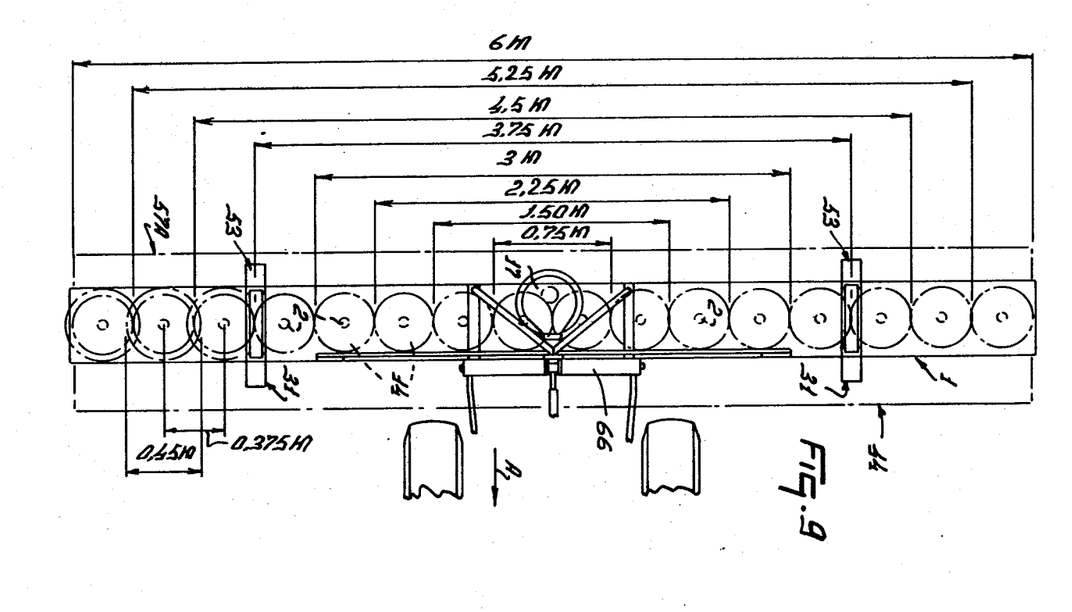
FIG. 9 is a plan view diagrammatically illustrating some of a number of different working widths which an implement in accordance with the invention may have.

As previously mentioned, the axes of rotation of the successive shafts 2, and thus of the successive rotary soil working or cultivating members 3, are spaced apart from one another by distances of exactly, or substantially, 37.5 centimeters. Each rotary soil working or cultivating member 3 has an effective working width a substantially 45 centimeters, i.e. substantially the diameter of the circle that is traced by the tips of the soil working portions of the tines 64 of the member 3 during rotation thereof. The distance of substantially 37.5 centimeters between the axes of rotation of neighbouring members 3 allows the total working width of the implement to be varied so as substantially to correspond to the conventional working widths of other implements or machines that may be used in combination with the soil cultivating implement by varying the total number of rotary soil working or cultivating member 3 that are provided. Purely as an example, a seed drill or a fertilizer distributor may be employed in combination with the soil cultivating implement of FIGS. 1 and 2 of the drawings. With the indicated spacing between the axes of rotation of the successive rotary soil working or cultivating members 3, the implement may have any of a number of different working widths which are all substantially equal to exact multiples of 75 centimeters, the effective combined working width of a single pair of the members 3. In this connection, reference is made to FIG. 9 of the drawings which diagrammatically illustrates eight different working widths from a minimum of 75 centimeters that corresponds to the provision of two of the members 3 up to a maximum of 6 meters which corresponds to the provision of sixteen of the members 3. Altough FIG. 9 of the drawings illustrates 6 meters as being the maximum working width, it is noted that it is, in fact, possible to extend this working width to a magnitude that is even greater than 6 meters. FIG. 9 of the drawings also indicates the distance of 37.5 centimeters between the axes of rotation of two neighbouring members 3 and the effective working width of 45 centimeters of a single one of those members 3. It will be apparent from a comparison between FIGS. 1 and 9 of the drawings that the implement which has been described, by way of example, with reference to FIGS. 1 and 2 has a working width of substantially 3 meters. The distance between the cultivating members 3 and their configuration with more than two tines result in a smooth running machine during normal operation. FIGS. 3 to 5 of the drawings illustrate an alternative soil cultivating implement in accordance with the invention which implement has a hollow box-shaped frame portion 70 that occupies the same position with respect to the direction A as does the previously described frame protion 1 but whose cross-section is hexagonal. It can be seen from FIG. 4 of the drawings that the hexagonal cross-section is not a strictly regular one but that the hexagonal is symmetrical about a substantially vertical plane that is substantially perpendicular to the direction A. The hollow frame portion 70 has an upper part 70A and a lower part 70B, said two parts 70A and 70B both being of a channel-shaped cross-section which would, in fact, be a trapezoidal cross-section if the longer parallel side thereof were present. The shorter parallel sides of the two incomplete trapezoidal cross-sections coincide with the flat top and the flat bottom of the frame portion 70, respectively. Upper and lower substantially horizontally disposed clamping rims 71 that extend throughout the transverse length of the frame portion 70 are provided where the upper and lower parts 70A and 70B meet and said rims 71 are secured to one another by rows of substantially vertically disposed bolts 72, an intervening gasket (not shown) preferably being provided. The opposite ends of the hollow frame portion 70 are closed by substantially vertical side plates 73 that are in parallel relationship with one another and substantially parallel relationship with the direction A. The horizontally or substantially horizontally disposed bottom of the lower part 70B of the frame portion 70 is formed with a row of holes whose center points are spaced apart from one another by distances of exactly, or substantially, 37.5 centimeters. The holes co-operate with bearing housings 74 whose lower ends carry flanges 75 that are secured by bolts 76 to the lower wall, around the peripheries of the holes, and to the bottoms of brackets 77 that embrace the lower part 70B of the frame portion 70 at locations in register with each of said holes. The brackets 77 have upper rims which lie against the lower surfaces of the clamping rims 71 of the lower frame portion part 70B. Similar, but relatively inverted, brackets 78 embrace the upper part 70A of the frame portion 70 at locations in register with the lower brackets 77 and with the holes in the bottom of the frame portion 70, said upper brackets 78 having rims which bear against the upper surfaces of the clamping rims 71 of the upper frame portion part 70A. As can be seen in the drawings, the bolts 72 which clamp the upper and lower rims 71, and any intervening gasket that is provided, to one another also secure the rims of the brackets 77 and 78 to the clamping rims 71. Further substantially vertically disposed bolts 78A fasten the upper substantially horizontally disposed parts of the brackets 78 to the similarly disposed upper wall or top of the upper frame portion part 70A. The co-operating brackets 77 and 78 thus effectively secure the bearing housings 74 in their appointed positions relative to the hollow frame portion 70 and also act to strengthen that frame portion.

In the embodiment that is being described with reference to FIGS. 3 to 5 of the drawings, there are eight of the bearing housings 74 and the bearings in each of those housings rotatably support a corresponding substantially vertical, or at least upwardly extending, shaft 79. The eight shafts 79 project above the tops of the bearing housings 74 inside the hollow frame portion 70 and are there provided with bevel pinions 80 whose teeth are in driven mesh with those of eight further bevel pinions 81 that are all secured to a substantially horizontal driving shaft 82 that extends parallel to the transverse length of the hollow frame portion 70 at a location inside the latter. The shaft 82 is rotatably supported in the upper part 70A of the frame portion 70 by bearings that are not illustrated in the accompanying drawings and it will be noted from FIG. 3 thereof that the pinions 81 are positioned on the shaft 82 in such a way that, when the implement is in operation, each shaft 79 and the parts which it carries will revolve in an opposite direction to that of the neighbouring shaft 79, or both of the neighbouring shafts 79. The directions of rotation of the shafts 79 and the parts which they carry are indicated by small arrows in FIG. 3. Substantially midway along its length, the shaft 82 is provided with a bevel pinion 83 whose teeth are in driven mesh with those of a bevel pinion 84 carried by a shaft 85 journalled in a bearing housing 86 fastened to the upper part 70A of the frame portion 70 in such a position that said shaft 85 extends obliquely upwardly, and forwardly with respect to the direction A, from the end thereof that carries the pinion 84 to the end thereof that projects from the front of said bearing housing 86. The obliquely upwardly and forwardly projecting end of the shaft 85 is splined or otherwise keyed to enable it to be placed in driven connection with the power take-off shaft of an agricultural tractor or other operating vehicle by way of an intermediate telescopic transmission shaft 87, which is of a construction that is known per se, having universal joints at its opposite ends. The bevel pinion 83 on the substantially horizontally disposed shaft 82 is also in driving mesh with the teeth of a further bevel pinion 88 that is located behind the shaft 82 with respect to the direction A. The bevel pinion 88 is fastened to the leading end of a shaft 89 that is in substantially horizontally parallel relationship with the direction A, said shaft 79 being rotatably mounted in a bearing housing 90 that is lodged in a rearwardly facing wall of the upper part 70A of the hollow frame portion 70.

Two pairs of substantially vertical plates 91 are mounted on top of the hollow frame portion 70 at corresponding distances inwardly from the side plates 73 thereof, all four plates 91 being substantially parallel to the direction A and the two plates 91 in each pair being spaced apart from one another by a short distance in a direction at right angles to the direction A. The two plates 91 of each pair are interconnected, near their rearmost edges, by substantially horizontal upper and lower stub shafts 92 and 93 that are disposed substantially exactly vertically one above the other. Each of the four stub shafts 92 and 93 has one end of a corresponding support arm 94 turnably mounted thereon between the associated pair of plates 91. The arms 94 extend generally rearwardly away from the stub shafts 92 and 93 and their rearmost ends are turnable about upper and lower substantially horizontal stub shafts 95 and 96 that perpendicularly interconnect the limbs of corresponding upright arms 98 of channel-shaped cross-section. The web or base of each channel-shaped arm 98 substantially perpendicularly interconnects the limbs thereof at the rear of those limbs with respect to the direction A and it will be evident from FIG. 4, in particular, of the drawings that the pivotable support arms 94 co-operate with the upright arms 98 in providing pivotable linkages that are in the form of parallelogram linkages 97, the stub shafts 92, 93, 95 and 96 being at the four corners thereof. Each upright arm 98 is of slowly but progressively increasing width in the direction A considered from its upper to its lower end and the lower ends of the two arms 98 are rigidly interconnected by a tubular support 99 that extends substantially horizontally perpendicular to the direction A throughout the transverse length of the hollow frame portion 70 and thus throughout substantially the whole of the working width of the implement. Brackets 100 that project downwardly from the bottom of the tubular support 99 carry, at their lower ends, a rear soil crumbling member that is generally indicated by the reference 101, said member 101 also extending substantially horizontally perpendicular to the direction A throughout the transverse length of the support 99 and thus throughout the transverse length of the hollow frame portion 70. The rear soil crumbling member 101 is releasably secured to the brackets 100 by bolts (FIG. 4) and takes the form of a bent plate whose cross-sectional shape is clearly visible in FIG. 4. The plate comprises three rib portions 102, 103 and 104 each of which is substantially L-shaped as seen in FIG. 4. Said portions 102 to 104 are arranged one behind the other with respect to the direction A and are of successively decreasing size, the leading portion 102 being the largest and the rearmost portion 104 being the smallest. As seen in FIG. 4, the lengths of the limbs of the rib portion 103 are substantially half those of the corresponding limbs of the rib portion 102 and the lengths of the limbs of the rib portion 104 are substantially one-third of those of the leading rib portion 102. The "free" edges of the limbs of each rib portion 102 to 104 are in contact with the ground surface except for the "free" edge of the shorter limb of the leading rib portion 102 which edge is perpendicularly connected to an additional edge portion 105. The longer limbs, as seen in FIG. 4, of all three of the rib portions 102, 103 and 104 are oriented upwardly and forwardly, with respect to the direction A, from their "free" edges that contact the ground surface and the relatively parallel edge portion 105 is similarly disposed. The shorter limbs of the three portions 102, 103 and 104 all extend perpendicular to the longer limbs and are orientated upwardly and rearwardly, with respect to the direction A, from their "free" edges that contact the ground surface in respect of the two rib portions 103 and 104, the "free" edge of the shorter limb of the leading rib portion 102 being perpendicularly connected to the upper extremity of the edge portion 105.

The top of the tubular support 99 is provided, substantially midway along its transverse length, with an upright support 106 that is of trapezoidal shape as seen in rear elevation (FIG. 5). Thus, the base of the upright support 106 that is welded or otherwise rigidly secured to the top of the tubular support 99 is of greater width than is the top thereof. Said top is provided with two horizontally spaced apart bearing housings 107 and 108 in which corresponding parallel shafts 109 and 110 that both extend substantially horizontally parallel to the direction A are rotatably journalled. The shafts 109 and 110 project rearwardly beyond the bearing housings 107 and 108 and there carry straight-toothed or spur-toothed pinions 111 and 112 whose sizes and positions are such that their teeth are in mesh with one another. The rear surfaces of the two pinions 111 and 112 have corresponding weights 113 secured to them in positions which are eccentric relative to the axes of rotation of the shafts 109 and 110 (see FIG. 5), said eccentric weights 113 being so positioned with respect to the axes of rotation of those two corresponding shafts 109 and 110 as to be 180° out of phase with each other. The leading end of the shaft 109 is connected by a universal joint to one end of a telescopic transmission shaft 114 whose opposite leading end is connected by a further universal joint to the rearmost end of the shaft 89 that projects from the back of the bearing housing 90.

The leading edges of the two substantially vertical plates 91 of each pair are interconnected by the web or base of a corresponding upright support 115 that is of channel-shaped cross-section, the limbs thereof projecting forwardly from the web or base with respect to the direction A. Said limbs are perpendicularly interconnected, near their upper and lower ends, by upper and lower substantially horizontal stub shafts 116 and 117 and support arms 118 that extends generally forwardly from said stub shafts 116 and 117 are turnable upwardly and downwardly about those stub shafts between the limbs of the upright supports 115. The opposite leading ends of the support arms 118 are turnably connected to the limbs of corresponding upright arms 121, that are of channel-shaped cross-section, by upper and lower substantially horizontal stub shafts 119 and 120. The web or base of each channel-shaped arm 121 is at the leading edges of its limbs with respect to the direction A and it will be seen from FIG. 4 of the drawings that the arms 121 increase very slightly in width, in the direction A, from their tops to their bottoms. The lower ends of the two arms 121 are fastened to the top of a tubular support 122 that extends substantially horizontally perpendicular to the direction A throughout the length of the hollow frame portion 70 and thus throughout substantially the whole of the working width of the implement. Brackets 123 project downwardly from substantially the bottom of the tubular support 122 and, at their lower ends, have fastening portions 124 to which a leading soil crumbling member that is generally indicated by the reference 126 is releasably secured by bolts 125. The leading soil crumbling member 126 is similar, or identical, to the rear soil crumbling member 101 but, during the use of the implement, the leading soil crumbling member 126 can also function to support the implement from the ground surface. It will be appreciated that the arms 121 are connected to the upright supports 115 by pivotable linkages that are in the form of parallelogram linkages 127, the stub shafts 116, 117, 119 and 120 being at the four corners thereof. The upper support arm 118 of each parallelogram linkages 127 is formed, substantially midway along its length, with a transverse hole that can be brought into register with any chosen horizontally aligned pair of holes 129 that are formed in plates 130 carried at the tops and fronts, with respect to the direction A, of the limbs of the upright supports 115, said holes 129 all being equidistant from the axis that is defined by the corresponding upper stub shaft 116. Horizontal locking pins 128 are provided for entry through the holes in the upper support arms 118 and through the chosen holes 129 in the plates 130 that flank said upper support arms 118. It will be appreciated that the use of the locking pins 128 will retain the paralellogram linkages 127 in corresponding angular position so that the leading soil crumbling member 126 is fixed at a corresponding horizontal level relative to that of the hollow frame portion 70. This chosen level is a principal factor in determining the height of the frame portion 70 above the ground surface during the operation of the implement.

The eight shafts 79 all project downwardly from beneath the bottom of the hollow frame portion 70 and are there splined or otherwise keyed so as firmly but releasably to receive hubs at the centers of substantially horizontal supports 131. The opposite ends of the substantially rectilinear supports 131 carry corresponding sleeve-shaped substantially vertical bearings 132 in which corresponding substantially vertical stub shafts 133 are rotatably mounted, the longitudinal axes (axes of rotation) of the stub shafts 133 being in parallel or substantially parallel relationship with the axes of rotation of the corresponding shafts 79. Each of the stub shafts 133 projects downwardly beyond the lowermost end of the corresponding bearing 132 and there has the web or base of an arcuate portion 134 of channel-shaped cross-section secured to it. The limbs of the channel of each arcute portion 134 project downwardly towards the ground from its web or base and a curved connecting portion 135 between two flat substantially strip-shaped tines 136 is received between the limbs of each arcuate portion 134, the curvature of the tine connecting portions 135 being the same as that of the arcuate portions 134. The pairs of tines 136 and the curves connecting portions 135 between them are made from single lengths of resilient strip-shaped material or sheet material which is advantageously spring steel. Each curved connecting portion 135 is retained between the limbs of the corresponding arcuate portion 134 by a concentrically curved clamping plate 137 and a bolt 138, Each of the spring steel or other resilient tines 136 has a downwardly projecting soil working portion that is substantially parallel to the axis of rotation of the corresponding stub shaft 133 but which, in fact, trails rearwardly from top to bottom by a few degrees relative to the direction in which it is intended that the tine 136 under consideration, and its companion, should revolve about the axis of the corresponding stub shaft 133 during the use of the implement. Each support 131, together with the corresponding two pairs of freely rotatable tines 136 and the parts which connect them to said support, constitutes a rotary soil working or cultivating member that is generally indicated by the reference 139 and, in the embodiment which is being described by way of example, there are eight of the rotary soil working or cultivating members 139, each one corresponding to one of the eight shafts 79.

The leading edges of the limbs of the two upright-supports 115 are interconnected by a frame beam 140 that is welded or otherwise rigidly secured to said edges, the beam 140 being of hollow formation and of polygonal cross-section, the square cross-section that is illustrated in FIG. 4 of the drawings being preferred. With this preferred square cross-section, the upper and lower surfaces of the beam 140 are both horizontally, of substantially horizontally, disposed. Lower parts of a coupling member or trestle 141 that is of substantially triangular configuration when seen in front or rear elevation are secured to the front of the frame beam 140, said coupling member or trestle 141 being constructed and arranged to enable the implement to be connected to the three-point lifting device or hitch of an agricultural tractor or other operating vehicle in the generally known manner which is illustrated in outline in FIGS. 3 and 4 of the drawings. Substantially the apex of the coupling member or trestle 141 is connected to two horizontally spaced apart locations at the rear of the hollow frame portion 70 by two strengthening tie beams 142 that diverge downwardly, and rearwardly with respect to the direction A, from the coupling member or trestle 142 to th rear of the frame portion 70.

In the use of the soil cultivating implement which has been described with reference to FIG. 3 to 5 of the drawings, its coupling member or trestle 141 is connected to the three-point lifting device of an agricultural tractor or other operating vehicle and the forwardly projecting splined or otherwise keyed end of the shaft 85 is placed in driven connection with the power take-off shaft of the same tractor or other vehicle by way of the known telescopic transmission shaft 87 which has universal joints at its opposite ends. The depth to which the tines 136 of the rotary soil working or cultivating members 139 should penetrate into the soil will depend upon a number of variable factors such as the nature and condition of the soil and the purpose for which it is intended after treatment. The maximum depth of penetration is controlled principally by adjusting the angularity of the parallelogram linkages 127 to bring the leading soil crumbling member 126 to an appropriate level relative to that of the frame portion 70, the chosen angularity of the linkages 127 being maintained by entering the locking pins 128 throug the corresponding pairs of horizontally aligned holes 129. As the implement move in the direction A over the soil that is to be cultivated, the soil working or cultivating members 139 will be rotated in the directions that are indicated by small arrows in FIG. 3 of the drawings, it being remembered that the direction of rotation of each member 139 is opposite to that of its neighbour, or to both of its neighbours. Each soil working or cultivating member 139 has a working width which is greater than the distance between the axes of rotation of the shafts 79 so that, as shown in FIG. 3 of the drawings, the strips of land that are worked by the individual members 139 overlap one another to produce, in effect, a single broad strip of worked soil. The leading implement-supporting soil crumblingmember 126 levels the strip of soil that is to be dealt with the members 139 immediately in advance of those members and simultaneously performs an initial crumbling action. The levelling is effected before the soil is encountered by the tines 136, the levelling action being brought about principally by the ground-contacting parts of the rib portions 102, 103 and 104 of the member 126, together with its leading edge portion 105. The initial crumbling action, on the other hand, is brought about principally by the upwardly directed sides of L-shaped rib portions 102, 103 and 104 which portions act upon any soil that passes over, rather than under, the leading soil crumbling member 126. Since the longer limbs of the L-shaped rib portions 102, 103 and 104 are inclined downwardly, and rearwardly with respect to the direction A, from top to bottom, there is a strong tendency for any adhering material to be scraped off. This is equally true of the similarly disposed leading edge portion 105 of the member 126 and said member is therefore self-cleaning to a large extent. Even when operating on wet and/or heavy soil, there is no great tendency for the angular cavities of the lower surface of the member 126 to become filled with continuously adhering soil. Although FIG. 4 shows the member 126 as contacting the soil surface along only four parallel lines, it will be realised that, in practice, said member 126 has a quite extensive area of contact with the ground surface so that the member is effective in supporting the implement from the ground surface, by way of the parallelogram linkages 127, during its forward progress in the direction A.

The rear soil/crumbling member 101 effects an after treatment of the soil that has been subject to the action of the immediately foregoing rotary soil working or cultivating members 139, the effect of the member 101 being somewhat similar to that of the member 126 but differing therefrom inasmuch as the member 101 does not give any support to the implement from the ground surface and is continuously vibrated, upwardly and downwardly, by the eccentric mechanism that comprises the pinions 111 and 112 and the weights 113 that are carried eccentrically thereby. The upward and downward vibratory movement of the rear soil crumbling member 101 is such that, in addition to crumbling and levelling the soil which it encounters, it exerts a gentle compressing action upon the soil surface. It is noted that the vibratory motion of the rear soil crumbling member 101 which is brought about by the rotation of the eccentric weights 113 takes place substantially only in a substantially vertical direction because the two shafts 109 and 110 revolve in opposite directions due to the intermeshing pinions 111 and 112, the two weights 113 being so disposed with respect to the axes of rotation of said shafts 109 and 110 that the tendency of one eccentric weight 113 to displace the member 101 substantially horizontally in one direction is counterbalanced by the simultaneous of the other weight 113 to move the member 101 substantially horizontally in the opposite direction. However, both weights 113 move upwardly simultaneously and downwardly simultaneously so that the tendency to vibration of the member 101 in substantially vertical directions is not suppressed. The connection of the member 101 to the frame portion 70 by way of the upright arms 98 and the parallelogram linkages 97 ensures that the member 101 can rise and fall relative to the frame portion 70 without difficulty to follow undulations in the surface of the ground, the optimum position of the member 101 relative to the ground surface being constantly maintained. When the implement is to undergo inoperative transport, it is lifted clear of contact with the ground by the three-point lifting device or hitch of the agricultural tractor or other vehicle which operates it and excessive downward displacement of the member 101 relative to the frame portion 70 under these circumstances is prevented by the provision of stops 143 (FIG. 4) carried at the lower rear corners of the plates 91 in the paths of downward movement of the lower support arms 94 of the parallelogram linkages 97.

The axes of rotation of the shafts 79 are, in the embodiment of FIGS. 3 to 5 of the drawings, spaced apart from one another by distances of exactly, or substantially, 37.5 centimeters as in the case of the embodiment of FIGS. 1 and 2 of the drawings and, once again, each rotary soil working or cultivating member 139 has a working width of substantially 45 centimeters. Thus, as has already been described with reference to FIG. 9 of the drawings, the implement can readily be given a working width which will match, or substantially match, that of another implement or machine with which it is to be used, such as a seed drill or fertilizer distributor, merely by providing an appropriate number of the rotary soil working or cultivating members 139. Thus, the implement can have any chosen one of a number of different working widths that increase in substantially 75 centimeter steps between a minimum of substantially 75 to the meter maximum which is illustrated in FIG. 9. One of those widths will exactly, or closely, match the standardised width of a fertiliser distributor, seed drill or other implement or machine with which the soil cultivating implement will be used in combination in working the soil. The soil crumbling members 44, 101 and 126 that have been described are all in the form of bent plates whose greatest dimensions extend substantially horizontally perpendicular to the direction A and it will be evident that they can readily be released from the remainder of the implement merely by temporarily removing the bolts 42 or 125. Alternative soil crumbling members of different working widths and/or different shapes can thus readily be substituted for the members 44, 101 and 126 that have been described. The use of soil crumbling members of different shapes to those that have been described above can be advantageous when soils of different types containing varying volumes of water per unit volume of soil are to be dealt with and FIGS. 6, 7 and 8 of the drawings illustrate three different soil crumbling members that may be substituted for the soil crumbling member 44 of FIGS. 1 and 2. However, it is to be understood that the soil crumbling members of FIGS. 6 to 8 of the drawings may equally well be substituted for the soil crumbling members 101 and/or 126 of the embodiment of FIGS. 3 to 5 of the drawings.

Figures 6, 7, 8:
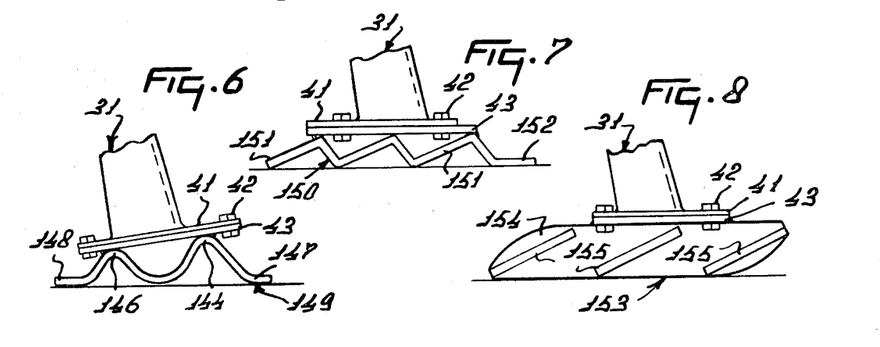

FIG. 6 illustrates a soil crumbling member that is generally indicated by the reference 149, said member 149 comprising a bent plate that has a somewhat irregular wave-shape as seen in side elevation or cross-section. As seen in FIG. 6, the plate comprises two peaks 144 and 146 with the leading peak 144, with respect to the direction A, at a slightly higher horizontal level than that of the rear and smaller peak 146. A trough is formed between the two peaks 144 and 146 and its lowermost extremity is in contact with, or very close to, the ground surface. The bent plate has a leading edge portion 147 that is substantially horizontally disposed and that is of narrow width in the direction A, said edge portion 147 being in contact with the ground surface. The plate also exhibits a free rear portion 148 which, like the leading edge portion 147, is horizontally or substantially horizontally disposed in contact with the ground surface. However, the free rear portion 148 has a greater width in the direction A than does the leading edge portion 147. As in the cases of the soil crumbling members 44, 101 and 126, the soil crumbling member 149 may be arranged to support the implement from the ground surface during its forward progress in the direction A or may be arranged in a non-supporting manner. The member 149 will usually perform the double function of levelling the ground surface by way of the downwardly directed parts of the bent plate and of crumbling soil which moves over the top of the plate by way of the peaks 144 and 146 and the intervening trough. The leading edge portion 47 assists in directing lumps of soil that require crumbling upwardly over the top of the member 149 and the free rear portion 148 gives a good levelling action and provides a quite large area of contact with the ground surface when the member 149 is used as an implement support.

FIG. 7 of the drawings illustrates a soil crumbling member that is generally indicated by the reference 150, the bent plate of said member being principally of non-uniform zig-zag configuration as seen in side elevation or cross-section. The zig-zag part of the plate comprises a plurality of rib-portions 151 (of which there are three in the embodiment of FIG. 7) with each rib portion comprising, as seen in FIG. 7, a shorter (with respect to the direction A) leading part or limb and a longer trailing part or limb, the longer parts being substantially double the width of the shorter parts. The lowermost extremity of the shorter part of the leading rib portion 151 integrally joins a leading edge portion 152 that is horizontally or substantially horizontally disposed so as to extend forwardly in the direction A from the front of the foremost rib portion 151. However, in this embodiment, the soil crumbling member 150 does not have a free rear portion and terminates at the rear edge of the longer part of that rib portion 151 which is at the back of the member 150 with respect to the direction A. In the use of a soil cultivating implement equipped with at least one of the soil crumbling members 150, that portion 150 acts in a generally similar manner to the soil crumbling portions that have previously been described, the downwardly facing surfaces of the rib portions 151 and the leading edge portion 152 acting to level the soil that is encountered by the member 150 while the upwardly directed surfaces of the same portions tend to crumble soil that passes over the top of the member 150 rather than underneath the same. The disposition of the leading edge portion 152 is such as to tend to direct any more or less loose lumps of soil that require crumbling upwardly over the top of the member 150. The member 150 has an adequate area of contact with the ground surface when it is to be used as an implement support.

FIG. 8 of the drawings illustrates a soil crumbling member that is generally indicated by the reference 153, said member comprising a plurality of interconnected strip-shaped plates. Two or more substantially vertically disposed strips 154 extend substantially parallel to the direction A in parallel relationship with one another and are interconnected by three strips 155 that are parallel to one another but arranged with their greatest dimensions substantially horizontally perpendicular to the direction A. As can be seen in FIG. 8, each strip 155 is disposed with its general plane inclined to the horizontal in such a way that its upper edge is further advanced with respect to the direction A than is its lower edge, the three strips 155 being regularly spaced one behind the other in the direction A. In the use of a soil cultivating implement furnished with at least one of the soil crumbling members 153, soil can pass, during progress in the direction A, between the strips 155 and becomes crumbled by contact with those strips and particularly as the lower edges of the strips 155 move forwardly over the soil, this action also giving a good levelling effect. The embodiment of FIGS. 1 and 2 of the drawings has been described as being furnished with the rear soil crumbling member 57A which comprises a plurality of the tine-like elements 56. It will, however, be realised that this is by no means essential and that said member 57A can, if desired, be replaced by one of the alternative members 44, 101/126, 149, 150 or 153 that have been described with reference to subsequent Figures of the drawings.

Figures 10, 11, 12, 13, 14:
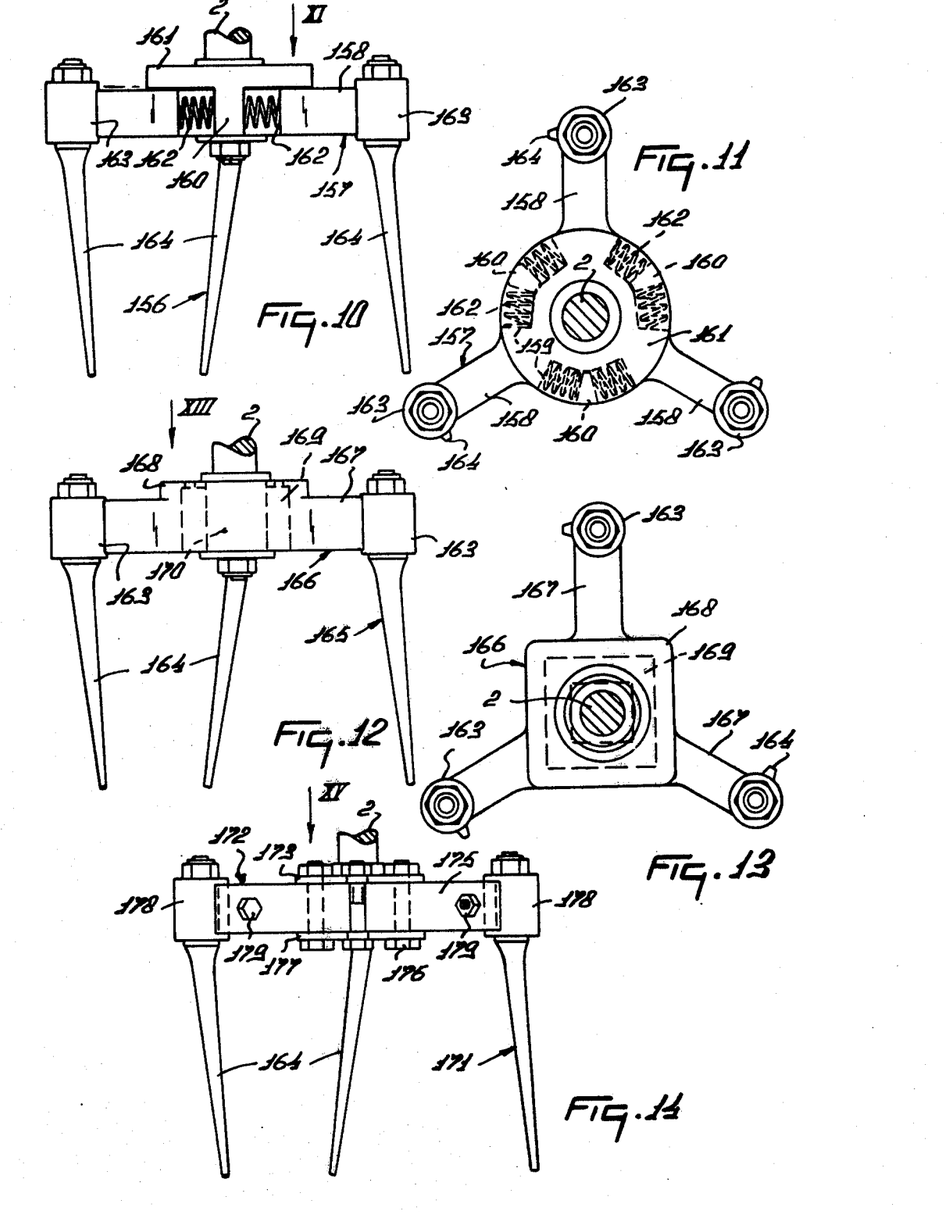

Rotary soil working or cultivating members 3 and 139 of two different kinds have so far been described but the use of members of these particular constructions is not essential and other alternative soil working or cultivating members may be substituted for them when such substitution would be likely to produce a superior result having regard to the nature and condition of the soil that is to be worked and the particular purpose to which that soil is to be put at the end of the cultivation. FIGS. 10 and 11 of the drawings illustrate a first alternative rotary soil working or cultivating member that is generally indicated by the reference 156. The member 156 comprises a support 157 having three arms 158 that project radially with respect to the axis of the shaft 2, to which the member 156 is shown as being connected, at 120° intervals around that axis. A central hub which comprises a flange 161 and three radial stops 160 is firmly but releasably secured to the lowermost end of the shaft 2 concerned and the support 157, which is movable relative to the central hub, is enclosed between the flange 161 and a washer (FIG. 10) disposed immediately above a retaining nut. The construction is such that three recesses 159 are formed in the body of the support 157, the three radial stops 160 being located centrally, or approximately centrally, in the corrsponding three recesses 159. Helical compression springs 162 are arranged in the recesses 159 to bear between the ends of those recesses and the opposite sides of the radial stops 160 and it will be apparent that the six springs 162 tend to maintain the support 157 in an equilibrium position relative to the central hub of the member 156 but that said support 157 can turn relative to the central hub in either one of two opposite directions against the opposition of three of the six springs 162. The outermost end of each arm 158 carries a cylindrical sleeve-like tine holder 163 whose longitudinal axis is parallel, or substantially parallel, to the axis of rotation of the corresponding substantially vertical, or at least upwardly extending, shaft 2. Fastening portions of three tines are firmly, but releasably, secured in the three holders 163, said tines having downwardly extending and downwardly tapering soil working portions 164 that preferably, as illustrated, trail rearwardly by a few degrees from top to bottom with respect to the intended direction of operative rotation of the member 156 concerned. This arrangement has already been described with reference to the tines 64 of the soil working or cultivating members 3 of the embodiment of FIGS. 1 and 2 of the drawings. It is noted that, while the member 156 is illustrated in FIGS. 10 and 11 of the drawings as being secured to one of the shafts 2, it could equally well be secured to one of the shafts 79 of the implement which forms the subject of FIGS. 3 to 5 of the drawings.

FIGS. 12 to 13 of the drawings illustrate a rotary soil working or cultivating member that is generally indicated by the reference 165. The member 165 comprises a support 166 having three arms 167 which project radially with respect to the axis of rotation of the corresponding shaft 2 (or 79) at 120° intervals around that axis. The inner ends of the arms 167 are secured to a hub 168 of the member 165 which hub is preferably of the square shape that is illustrated but which could also be of some other polygonal or non-circular shape. The hub 168 is formed with a square recess in which is centrally located a square block 170 fixedly secured to the lowermost end of the corresponding shaft 2 (or 79). The square recess is filled, between the internal walls thereof and the external walls of the block 170, with a resilient material 169 that may be natural rubber or a synthetic plastics material having resilient rubber-like properties. The support 166 is turnable between a flange on the shaft 2 (or 79) and a washer associated with the retaining nut of that shaft but the turnability is resiliently opposed in both directions, by rubber or other like material 169. As in the preceding embodiment, the resilient deflectability of the support 166 can take place in a plane that is perpendicular to the longitudinal axis of the shaft 2 (or 79) concerned. The tines of the soil working or cultivating member 165 are mounted in the same way as has already been described with reference to FIGS. 10 and 11 of the drawings.

Figures 15, 16, 17, 18, 19:
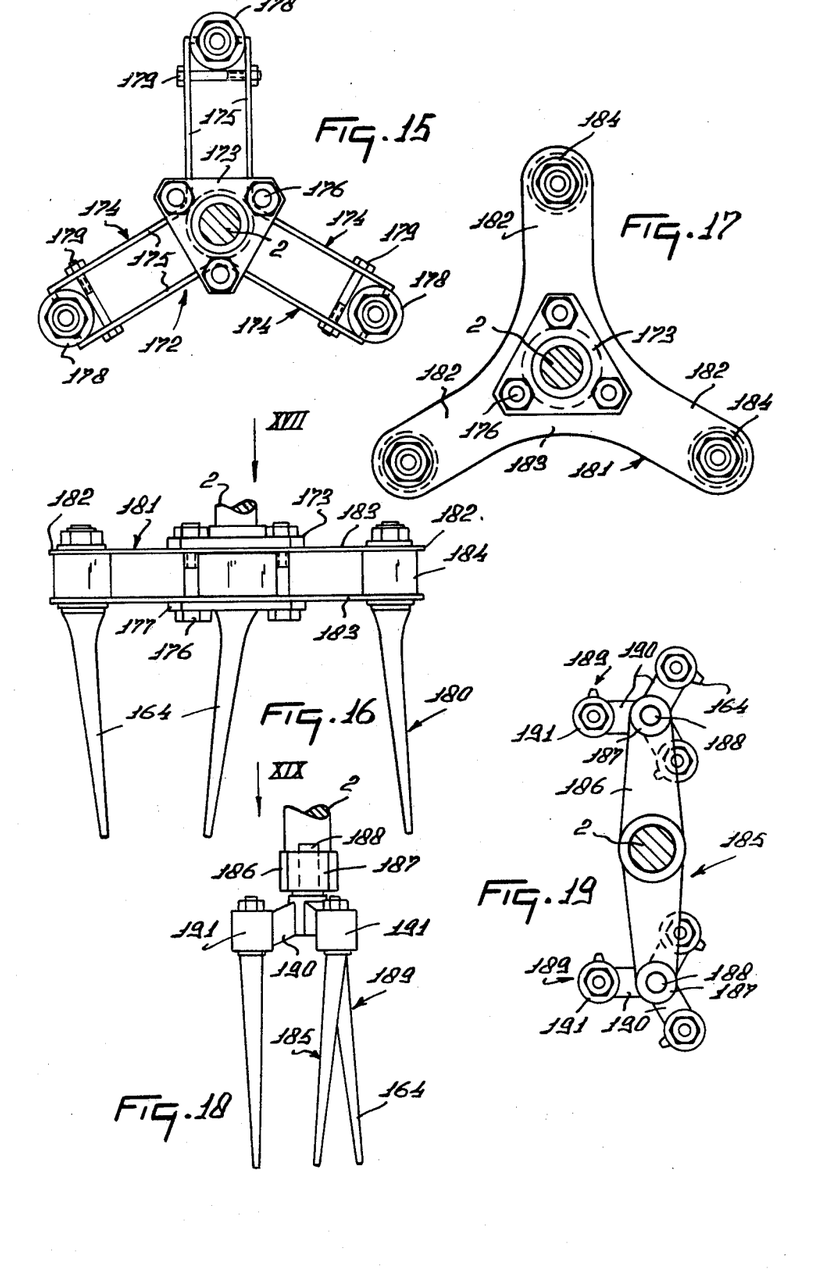

FIGS. 14 and 15 illustrate a rotary soil working or cultivating member that is generally indicated by the reference 171. The member 171 comprises a support 172 that is connected to the lowermost end of the shaft 2 (or 79) concerned by a substantially triangular hub 173 (see FIG. 15). The support 172 has three arms 174 that project substantially radially with respect to the axis of rotation of the shaft 2 (or 79) at substantially 120° intervals around that shaft. Each arm 174 comprises two substantially parallel spring steel or other resilient strips 175 that lie in spaced apart relationship, the widths of the strips 175 being parallel or substantially parallel to the axis of the shaft 2 (or 79) concerned. It can be seen from FIGS. 14 and 15 of the drawings that, in fact, the three arms 174 comprise only three of the spring steel or other resilient strips 175 since each strip 175 comprises two integral portions that are inclined at substantially 120° to each other, the two portions respectively corresponding to different ones of the arms 174. At the sharp angular junctions between the two portions of each strip 175, bolts 176 extend substantially parallel to the axis of the shaft 2 (or 79) carrying the hub 173 and fasten the strips 175 in their appointed positions by co-operating with an underlying substantially triangular clamping plate 177. The outer ends of the two strips 175 of each arm 174 are bent over perpendicularly towards one another and are entered in grooves formed in the outer surface of a corrsponding substantially cylindrical sleeve-like tine holder 178 clamped between them. The clamping is effected by a bolt 179 entered through registering holes in the two strips 175 of the arm 174 immediately adjacent to the holder 178. Apart from their mounting, the holders 178 are analogous to the previously described holders 163 and carry the previously described tines in the same manner as do the holders 163. In this case, the resilient construction of each arm 174 enables each tine to deflect in either of two opposite directions around the axis of the corresponding shaft 2 (or 79) away from a normal equilibrium position against the resilient opposition of the corresponding pair of strips 175.

FIGS. 16 and 17 of the drawings illustrate a rotary soil working or cultivating member that is generally indicated by the reference 180. The member 180 comprises a support 181 that is fastened to the previously described substantially triangular hub 173 at the lower end of the corresponding shaft 2 (or 79). The support 181 has three arms 182 that project radially with respect to the axis of the shaft 2 (or 79) at 120° intervals around that axis, said arms 182 being afforded by two plates 183 made of spring steel sheet or other resilient sheet material which plates 183 are spaced apart from one another in the longitudinal direction of the axis of the shaft 2 (or 79) concerned. The outer ends of the resilient plates 183 that afford the three arms 182 have cylindrical sleeve-like tine holders 184 clamped between them, the clamping being effected in a manner which is not shown in detail in the drawings by the fastening portions of the co-operating tines that are similar, or identical, to the tines of FIGS. 10 to 15 of the drawings. In this embodiment, the soil working portions 164 of the tines can deflect upwardly and downwardly along arcuate paths in directions substantially parallel to the axis of the corresponding shaft 2 (or 79) due to the fact that the arms 182 which carry said tines are afforded by the spring steel or other resilient plates 183. The plates 183 tend to remain in substantially planar equilibrium configurations and, accordingly, any such upward or downward deflection of one of the tines is resiliently opposed by the plates 183.

FIGS. 18 and 19 of the drawings illustrate a rotary soil working or cultivating member that is generally indicated by the reference 185. In this embodiment, an arm 186 comprises a central hub that is releasably secured to the lowermost end of the co-operating shaft 2 (or 79). The arm 186 is radially disposed with respect to the axis of the shaft 2 (or 79) and its opposite ends are provided with substantially vertical bearings 187 in which corresponding stub shafts 188 are received in a freely rotatable manner. The axes of the stub shafts 188 are parallel or substantially parallel to the axis of the shaft 2 (or 79) concerned and each shaft 188 carries, at the lower end thereof that projects from beneath the corresponding bearing 187, a support 189 comprising three arms 190 that project outwardly with respect to the axis of the stub shaft 188 at 120° intervals therearound. However, as can be seen in FIG. 18 of the drawings, the arms 190 are not truly radial with respect to the axis of the corresponding shaft 188 but are inclined downwardly towards the ground surface from their inner to their outer ends. The outer ends of the arms 190 carry corresponding cylindrical sleeve-like tine holders 191 in which the fastening portions of tines that are similar, or identical, to the tines of FIGS. 10 to 17 of the drawings are firmly, but releasably, secured.

The tines which comprise the soil working portions 164 are, in the embodiments of FIGS. 10 to 17 of the drawings, resiliently deflectable in two opposite, or substantially opposite directions, relative to the corresponding shaft 2 (or 79). In the embodiments of FIGS. 10 to 15 inclusive, such deflection is possible in directions that are substantially perpendicular to the axis of the corresponding shaft 2 (or 79) whereas, in the embodiment of FIGS. 16 and 17, the deflectability is possible along somewhat arcuate lines and thus in directions which have major components that extend parellel to the axis of the corresponding shaft 2 (or 79). Since the tines are resiliently deflectable with respect to the shafts 2 (or 79), their fastening portions and the holders with which those portions co-operate will not readily be damaged or broken during operation as a result of collisions with stones or other firmly embedded obstacles in the soil since the tines can deflect resiliently to circumnavigate such obstacles. In the embodiment of FIGS. 18 and 19 of the drawings, each rotary soil working or cultivating member 185 comprises the two tined supports 189 which are both freely rotatable about corresponding axes. Thus, any tine which meets an embedded stone or other substantially immovable obstacle can deflect to circumnavigate or otherwise avoid that obstacle by virtue of the rotatability of the support 189 to which it is fixed about the axis of the corresponding stub shaft 188.

Although certain features of the soil cultivating implements that have been described and/or that are illustrated in the accompanying drawings will be set forth in the following claims as inventive features, it is emphasised that the invention is not necessarily limited to those features and that it includes within its scope each of the parts of each soil cultivating implement embodiment that has been described, and/or that is illustrated in the accompanying drawings, both individually and in various combinations.

What I claim is:

1. A soil cultivating machine comprising a frame and a plurality of tined rotors arranged in a transverse row and said rotors being journalled on a transverse elongated portion of said frame, driving means engaging upwardly extending shafts and said rotors being mounted for rotation about corresponding axes defined by said shafts, a non-rotatable leading soil crumbling member being linked to the frame portion and positioned in advance of the row of rotors with respect to the direction of travel, said crumbling member comprising an elongated ground engaging surface that extends transverse and substantially across the entire length of said row, said member being pivoted to the frame portion by parallelogram linkage means having linkage arms positioned one above the other and four spaced apart pivot connections that pivot about substantially horizontal axes, adjusting means interconnecting said linkage means to said machine and fixing said ground engaging surface in any one of a plurality of supporting positions at different horizontal levels during machine travel, said member being displaceable about the pivot connections and fixable in any one of said positions, a spring mechanism on said linkage means positioned to normally bias said surface to a selected one of said positions without substantially tilting said crumbling member.

2. A machine as claimed in claim 1, wherein a further soil crumbling member is pivoted to the frame portion through parallelogram linkage means and positioned to the rear of said rotors, said further member being feely displaceable in level relative to the remainder of said machine.

3. A machine as claimed in claim 2, wherein said further crumbling member comprises a plurality of tine-like elements that are resilient and arranged side-by-side.

4. A machine as claimed in claim 1, wherein said crumbling member comprises an elongated plate that is fastened to upwardly extending arm means linked to said frame portion.

5. A machine as claimed in claim 4, wherein said plate comprises a plurality of ground engaging edge portions that are located one behind the other with respect to the direction of travel and each portion is inclined to the horizontal.

6. A soil cultivating machine as claimed in claim 5, wherein said crumbling member is positioned adjacent said rotors and a further crumbling member is positioned to the rear of said rotors.

7. A machine as claimed in claim 6, wherein both crumbling members are connected to the frame portion with corresponding pivotable linkages.

8. A machine as claimed in claim 7, wherein said linkages are parallelogram linkages and each linkage has four pivots.

9. A soil cultivating machine comprising a frame and a plurality of tined rotors arranged in a transverse row and said rotors being journalled on a transverse elongated portion of said frame, driving means engaging upwardly extending shafts and said rotors being mounted for rotation about corresponding axes defined by said shafts, a non-rotatable soil crumbling member linked to the frame portion in advance of the row of rotors with respect to the direction of travel, said crumbling member comprising elongated plate means having a ground engaging surface that extends transverse and across substantially the entire length of said row, and said surface having elongated edge portions positioned successively one behind the other, said member being pivoted to said frame portion by parallelogram linkage means comprising linkage arms located one above the other and four spaced apart connections between the arms and frame portions that pivot about substantially horizontal axes, adjusting means interconnecting said arms to said frame portion and fixing said surface in any one of a plurality of supporting positions at different horizontal levels during machine travel, said member being displaceable about the pivot connections and fixable in any one of said positions with said adjusting means without tilting said crumbling member, an upper linkage arm mounting a spring mechanism that normally biases said linkage means and said crumbling member to a selected position.

10. A machine as claimed in claim 9, wherein said plate means comprises an elongated bent plate and said surface includes rib portions.

11. A machine as claimed in claim 10, wherein each rib portion is substantially U-shaped in configuration when seen in cross-section.

12. A machine as claimed in claim 11, wherein the limbs of the rib portions are inclined upwardly and forwardly.

13. A machine as claimed in claim 12, wherein the webs of said rib portions are disposed alternately at the top and the bottom of the said crumbling member.

14. A machine as claimed in claim 13, wherein a limb of the leading rib portion has a lower part which is bent over downwardly and rearwardly that comprises a leading edge portion.

15. A machine as claimed in claim 10, wherein the rib portions are L-shaped in configuration when seen in cross-section.

16. A machine as claimed in claim 10, wherein the foremost limb of a leading rib portion is bent downwardly and rearwardly and comprises an edge portion that is in substantially parallel relationship with the rear limb of that same rib portion.

17. A machine as claimed in claim 10, wherein said plate is substantially wave-shaped as seen in cross-section.

18. A machine as claimed in claim 17, wherein the peaks of the substantially wave-shaped rib portions successively decrease in height from the front to the rear of the plate.

19. A machine as claimed in claim 10, wherein said plate comprises a plurality of strips that extend transverse to the direction of travel.

20. A soil cultivating machine comprising a frame and a plurality of tined rotors arranged in a transverse row and said rotors being journalled on a transverse elongated portion of said frame, support plate means mounted on the frame portion and extending above that portion, driving means engaging upwardly extending shafts and said rotors being mounted for rotation about corresponding axes defined by said shafts, a non-rotatable leading soil crumbling member being linked to the frame portion and positioned in advance of the row of rotors with respect to the direction of travel, said crumbling member comprising an elongated plate having a ground engaging corrugated surface that extends transverse and across substantially the entire length of said row, said member having upwardly extending support arm means pivoted to said plate means by parallelogram linkage arms and four spaced apart pivot connections, said connections being pivotable about substantially horizontal axes, adjusting means interconnecting said arms to said plate means and fixing said surface in any one of a plurality of supporting positions at different levels during machine travel, said member being displaceable about said connections and fixable in any one of said positions, an upper linkage arm comprising a spring mechanism that normally biases said crumbling member to a selected one position.

21. A machine as claimed in claim 20, wherein said plate means comprises substantially vertical plates mounted on top of said frame portion and a respective supporting arm of said crumbling member is pivoted to each of said vertical plates through the linkage arms.

22. A machine as claimed in claim 20, wherein said adjusting means interconnects at least one of the linkage arms to a respective plate and the angularity of said linkage is fixed by the adjusting means.

23. A machine as claimed in claim 22, wherein said spring mechanism comprises a compression spring surrounding a rod.

* * * * *